(12) United States Patent
Takahashi (10) Patent No.: US 9,712,661 B2
(45) Date of Patent: Jul. 18, 2017

(54) WIRELESS COMMUNICATION SYSTEM, VEHICLE COMMUNICATION APPARATUS, AND PORTABLE COMMUNICATION APPARATUS

(71) Applicant: DENSO CORPORATION, Kariya, Aichi-pref. (JP)

(72) Inventor: Tomohiro Takahashi, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 49 days.

(21) Appl. No.: 14/653,197

(22) PCT Filed: Nov. 26, 2013

(86) PCT No.: PCT/JP2013/006926
§ 371 (c)(1),
(2) Date: Jun. 17, 2015

(87) PCT Pub. No.: WO2014/097548
PCT Pub. Date: Jun. 26, 2014

(65) Prior Publication Data
US 2015/0341480 A1     Nov. 26, 2015

(30) Foreign Application Priority Data
Dec. 19, 2012   (JP) ................................ 2012-276842

(51) Int. Cl.
*H04W 4/00* (2009.01)
*H04M 1/725* (2006.01)
(Continued)

(52) U.S. Cl.
CPC .......... *H04M 1/7253* (2013.01); *H04B 1/082* (2013.01); *H04W 4/00* (2013.01);
(Continued)

(58) Field of Classification Search
None
See application file for complete search history.

(56) References Cited

U.S. PATENT DOCUMENTS

2007/0120948 A1*  5/2007  Fujioka ................... H04M 1/66
                                                              348/14.01
2007/0129116 A1   6/2007  Katoh et al.
(Continued)

FOREIGN PATENT DOCUMENTS

| EP | 2716502 A1 | 4/2014 |
|---|---|---|
| JP | H10276480 A | 10/1998 |

(Continued)

OTHER PUBLICATIONS

International Search Report and Written Opinion (in Japanese with English Translation) for PCT/JP2013/006926, mailed Feb. 18, 2014; ISA/JP.

*Primary Examiner* — Nicholas Sloms
(74) *Attorney, Agent, or Firm* — Harness, Dickey & Pierce, P.L.C.

(57) ABSTRACT

In a wireless communication system, a vehicle communication apparatus and a portable communication apparatus provide service in cooperation. Both the apparatuses execute in cooperation each of a first application and a second application. When switching from the first application to the second application, a connection destination of a specific profile used in both the apparatuses is switched from the first application to the second application. This improves the connection of profiles.

21 Claims, 7 Drawing Sheets

(51) Int. Cl.
*H04B 1/08* (2006.01)
*H04W 4/04* (2009.01)
*H04M 1/60* (2006.01)

(52) U.S. Cl.
CPC .......... *H04W 4/008* (2013.01); *H04W 4/046* (2013.01); *H04M 1/6091* (2013.01); *H04M 2250/02* (2013.01)

(56) References Cited

U.S. PATENT DOCUMENTS

| | | | |
|---|---|---|---|
| 2008/0275992 A1* | 11/2008 | Basty | H04W 76/02 709/227 |
| 2010/0144397 A1* | 6/2010 | Azuma | G01C 21/26 455/569.2 |
| 2011/0183619 A1 | 7/2011 | Satoh et al. | |
| 2012/0260268 A1* | 10/2012 | Mirkin | G01C 21/26 719/328 |
| 2013/0329632 A1* | 12/2013 | Buyukkoc | H04W 4/00 370/328 |
| 2014/0073254 A1 | 3/2014 | Ichihara et al. | |

FOREIGN PATENT DOCUMENTS

| | | |
|---|---|---|
| JP | 2006129115 A | 5/2006 |
| JP | 2006157745 A | 6/2006 |
| JP | 2007281652 A | 10/2007 |
| JP | 2010199718 A | 9/2010 |
| JP | 2011155319 A | 8/2011 |
| WO | WO-2012160668 A1 | 11/2012 |

* cited by examiner

FIG. 6B (AFTER DEPRESSING "YES")

FIG. 6C

WIRELESS COMMUNICATION SYSTEM, VEHICLE COMMUNICATION APPARATUS, AND PORTABLE COMMUNICATION APPARATUS

CROSS REFERENCE TO RELATED APPLICATIONS

This application is a U.S. National Phase Application under 35 U.S.C. 371 of International Application No. PCT/JP2013/006926 filed on Nov. 26, 2013 and published in Japanese as WO 2014/097548 A1 on Jun. 26, 2014. This application is based on and claims the benefit of priority from Japanese Patent Application No. 2012-276842 filed on Dec. 19, 2012. The entire disclosures of all of the above applications are incorporated herein by reference.

TECHNICAL FIELD

The present disclosure is related to a vehicle communication apparatus, a portable communication apparatus, and a wireless communication system in which service is provided by the cooperation of the vehicle communication apparatus and the portable communication apparatus.

BACKGROUND ART

A wireless communication system is provided to include a plurality of wireless communication apparatuses that cooperate mutually with a predetermined application to provide service. Applications may be executed, in cooperation, by both a portable communication apparatus that a user can carry (for example, a mobile-phone or Smartphone) and a vehicle communication apparatus in a vehicle (for example, a car navigation apparatus), through a wireless communication. For instance, when a user is aboard the vehicle, a screen of the portable communication apparatus is displayed on a display unit of the car navigation apparatus, while an application of the portable communication apparatus is executed or outputted by a manipulation on the car navigation. As such, a wireless communication system is devised to provide services by choosing an optimal service provision mode according to various situations of the vehicle and user (refer to Patent Literature 1).

PRIOR ART LITERATURES

Patent Literature

Patent Literature 1: JP 2007-281652 A

SUMMARY OF INVENTION

A vehicle communication apparatus and a portable communication apparatus operate in cooperation, for example, through a short-range wireless communication with Bluetooth (a registered trademark). Such configuration poses the following trouble. Suppose that an application providing services of a portable communication apparatus to a vehicle communication apparatus is cooperated with an application providing services of the vehicle communication apparatus to the portable communication apparatus. Such case sometime involves a trouble to cause the communications in connecting a specific profile to conflict, or a trouble to interfere with concurrent connections of a specific profile by several applications. This leads to a difficulty of the vehicle communication apparatus and the portable communication apparatus in providing services in cooperation.

An object of the present disclosure is to provide a wireless communication system, a vehicle communication apparatus, and a portable communication apparatus. Those can each provide services properly with a first application or a second application by appropriately switching the connection of a specific profile to be used, even when the vehicle communication apparatus and the portable communication apparatus execute, in cooperation, the first application or the second application.

According to an example of the present disclosure, a wireless communication system includes a vehicle communication apparatus, which includes an in-vehicle application execution device operable to execute an application and an in-vehicle profile connection device connecting one or more profiles; and a portable communication apparatus, which includes an in-portable application execution device operable to execute an application and an in-portable profile connection device connecting one or more profiles.

The wireless communication system connects a first profile that specifies short-range wireless communication of data between the in-vehicle profile connection device and the in-portable profile connection device even when the in-vehicle application execution device and the in-portable application execution device execute in cooperation any one of a first application and a second application.

The wireless communication system further includes a determination device that determines a switching request of an executing state of an application; and a profile connection control device that controls connection of one or more profiles between the in-vehicle profile connection device and the in-portable profile connection device.

When the determination device determines a switching request from a first executing state, in which a first application is executed in cooperation by the in-vehicle application execution device and the in-portable application execution device, to a second executing state, in which a second application is executed in cooperation by the in-vehicle application execution device and the in-portable application execution device, the profile connection control device switches from a connection of the first profile by the first application between the in-vehicle profile connection device and the in-portable profile connection device to a connection of the first profile by the second application between the in-vehicle profile connection device and the in-portable profile connection device.

This configuration can switch the connection of a predetermined profile from the first application to the second application when an application to be executed in cooperation by an in-vehicle application execution device and an in-portable application execution device is switched from the first application to the second application. This enables to remove trouble such as a conflict in communication for connecting a profile or difficulty in concurrent connection of a profile by a plurality of applications.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments of the present disclosure are described in detail with reference to drawings. The following defines "switching" the connection of a profile as including connecting, disconnecting, and reconnecting a profile, and combinations of them.

(First Embodiment)

A first embodiment of the present disclosure is explained with reference to FIG. 1 through FIG. 4. Hereinafter, an "application" may be simply referred to as an "app"; "Bluetooth" (a registered trademark) may be simply as "BT."

Figure 1:
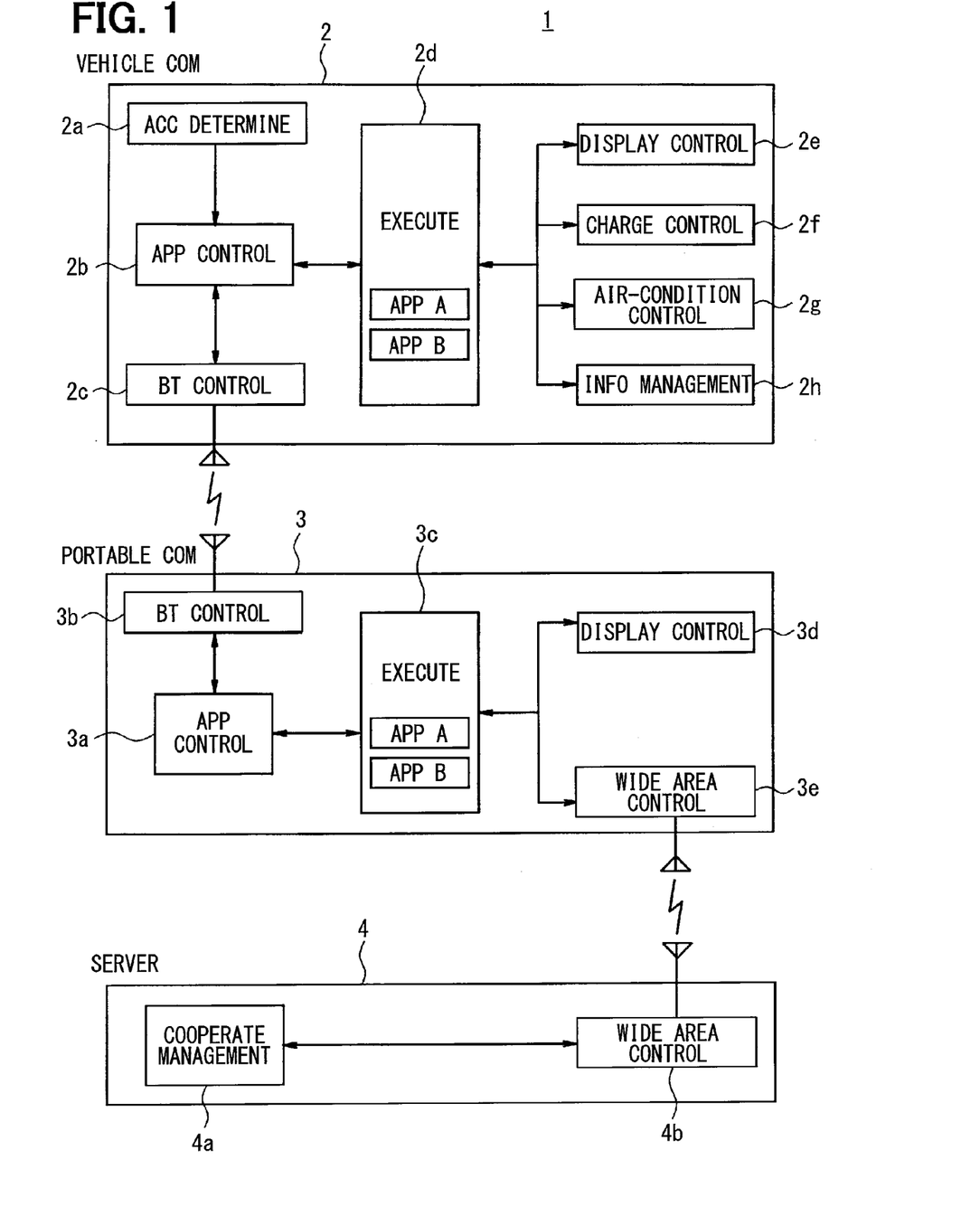
FIG. 1 is a block diagram illustrating schematically a configuration of a wireless communication system.

As illustrated in FIG. 1, a wireless communication system 1 includes a vehicle communication apparatus 2, a portable communication apparatus 3, and a distribution center (server) 4; they can be mutually connected via a wireless communication. For example, the vehicle communication apparatus 2 and the portable communication apparatus 3 can be connected by Bluetooth. The portable communication apparatus 3 and the distribution center 4 can be connected by a wide area communication. The vehicle communication apparatus 2 is a car navigation apparatus; the portable communication apparatus 3 is a mobile-phone or Smartphone.

The vehicle communication apparatus 2 includes an ACC determination unit 2a; a connecting application control unit 2b (a determination device or means, an in-vehicle profile connect control device or means); a BT communication control unit 2c (an in-vehicle profile connection device or means); an application execution unit 2d (an in-vehicle application execution device or means); a display control unit 2e; a charge control unit 2f; an air conditioning control unit 2g; and a vehicle information managing unit 2h.

The vehicle communication apparatus 2 is connected to various switches such as an ACC (a vehicle power source or a vehicle electric power supply) switch and various ECUs such as an air conditioning control ECU, via an in-vehicle LAN (unshown). The vehicle communication apparatus 2 may be mounted to the vehicle in a fixed or removable manner.

The ACC determination unit 2a receives an ACC signal inputted from the ACC switch, determines whether the ACC switch is ON or OFF, and outputs the determination result to the connecting application control unit 2b. When the determination result is inputted from the ACC determination unit 2a, the connecting application control unit 2b determines a switching request that requests switching of an executing state of an application, based on the determination result. That is, when the ACC switch changes from OFF to ON, it is determined that there is a switching request to an executing state to execute an application A; when the ACC switch changes from ON to OFF, it is determined that there is a switching request to an executing state to execute an application B.

The connecting application control unit 2b outputs to the connecting application control unit 3a the determination result of the switching request to an executing state to execute the application A or the application B. The connecting application control unit 2b cooperates with the connecting application control unit 3a in the portable communication apparatus 3 based on the determination result, so as to (i) control connection of a profile between the BT communication control units 2c and 3b, and (ii) control the executing state of the application A and the application B in the application execution unit 2d.

By a control instruction from the connecting application control unit 2b, the BT communication control unit 2c controls (i) the connection of a BT communication line with the BT communication control unit 3b of the portable communication apparatus 3, and (ii) the connection of various profiles in the connected state of the BT communication line.

By a control instruction from the connecting application control unit 2b, the application execution unit 2d executes the application A (a first application) in the vehicle communication apparatus 2. In this case, the application execution unit 2d cooperates with the application execution unit 3c in the portable communication apparatus 3, and outputs to the display control unit 2e a display instruction according to the display content information inputted from the application execution unit 3c. Upon receiving the display instruction from the application execution unit 2d, the display control unit 2e displays a screen accordingly on a display unit (unshown) of the vehicle communication apparatus 2.

The application execution unit 2d also executes the application B (a second application) in the vehicle communication apparatus 2 by the control instruction from the connecting application control unit 2b. In this case, the application execution unit 2d cooperates with the application execution unit 3c in the portable communication apparatus 3, and outputs (i) a charge control instruction to the charge control unit 2f, (ii) an air conditioning control instruction to the air conditioning control unit 2g, or (iii) a vehicle information management instruction to the vehicle information managing unit 2h.

Upon receiving a charge control instruction from the application execution unit 2d, the charge control unit 2f performs charge control by controlling an engine system and a battery system (unshown) of the vehicle accordingly. Upon receiving an air conditioning control instruction from the application execution unit 2d, the air conditioning control unit 2g performs a pre-air conditioning by controlling an air conditioner (unshown) of the vehicle accordingly. Upon receiving a vehicle information management instruction from the application execution unit 2d, the vehicle information managing unit 2h stores and manages vehicle information, such as fuel efficiency information and a driving history of the vehicle, accordingly. Upon receiving an information output instruction from the application execution unit 2d, the vehicle information managing unit 2h outputs the stored/managed vehicle information to the application execution unit 2d. The present application uses the term "information" not only as an uncountable noun but also as a countable noun.

The portable communication apparatus 3 includes a connecting application control unit 3a (an in-portable profile connection control device or means); a BT communication control unit 3b (an in-portable profile connection device or means); an application execution unit 3c (an in-portable application execution device or means); a display control unit 3d; and a wide area communication control unit 3e. When having a voice call function, the portable communication apparatus 3 includes, in addition to the functional blocks described above, a microphone to collect voices of a user; an encoding device to encode voices collected by the microphone; a decoding device to decode voices from the call partner; and a speaker to output voices decoded by the decoding device.

The connecting application control unit 3a cooperates with the connecting application control unit 2b in the vehicle communication apparatus 2, based on the determination result of the switching request switching to the executing state in which to execute the application A or the application B inputted from the connecting application control unit 2b. The connecting application control unit 3a controls (i) the connection of the profile between the BT communication control units 3b and 2c and (ii) the executing state of the application A and the application B in the application execution unit 3c.

Upon receiving a control instruction from the connecting application control unit 3a, the BT communication control unit 3b controls (i) the connection of the BT communication line with the BT communication control unit 2c of the vehicle communication apparatus 2 and (ii) the connection of various profiles in the connected state of the BT communication line.

The application execution unit 3c executes the application A in the portable communication apparatus 3, by a control instruction from the connecting application control unit 3a. The connecting application control unit 3a outputs the control instruction based on a determination result of the switching request as to whether to switch to the executing state to execute the application A or the application B; the determination result is inputted from the connecting application control unit 2b. In this case, the application execution unit 3c cooperates with the application execution unit 2d and outputs the display content information of the portable communication apparatus 3 to the application execution unit 2d. The application execution unit 2d outputs to the display control unit 2e the display instruction according to the display content information from the application execution unit 3c. The display control unit 2e displays the screen according to the display instruction from the application execution unit 2d on a display unit (unshown) of the vehicle communication apparatus 2.

Further, the application execution unit 3c executes the application B in the portable communication apparatus 3, by a control instruction from the connecting application control unit 3a. The connecting application control unit 3a outputs the control instruction based on a determination result of the switching request as to whether switch to the executing state to execute the application A or the application B; the determination result is inputted from the connecting application control unit 2b. In this case, the application execution unit 3c cooperates with the application execution unit 2d, and outputs to the display control unit 3d a display instruction according to the display content information inputted from the application execution unit 2d. The display control unit 3d displays the screen according to the display instruction inputted from the application execution unit 3c on a display unit (unshown) of the portable communication apparatus 3. In cooperation with the application execution unit 2d, the application execution unit 3c controls the charge control unit 2f, the air conditioning control unit 2g, or the vehicle information managing unit 2h.

Upon receiving a connection control instruction from the application execution unit 3c, the wide area communication control unit 3e controls the wireless communication with the wide area communication control unit 4b of the distribution center 4 via wide area networks, such as a mobile-phone channel and an Internet channel.

The distribution center 4 includes a cooperation-information control managing unit 4a and a wide area communication control unit 4b. The cooperation-information control managing unit 4a manages and controls information necessary for the cooperation in the distribution center 4. The wide area communication control unit 4b performs a wireless communication with the wide area communication control unit 3e of the portable communication apparatus 3, and transmits the information in the cooperation-information control managing unit 4a to the portable communication apparatus 3.

In the present embodiment, the vehicle communication apparatus 2 and the portable communication apparatus 3 switch the executing state of the application A and the application B depending on whether the user is using the vehicle or not. Namely, when the ACC switch is ON, it is determined that the user is using the vehicle, and the application execution units 2d and 3c cooperate mutually and execute the application A (an executing state 1 to be described later). On the other hand, when the ACC switch is OFF, it is determined that the user is not using the vehicle, and the application execution units 2d and 3c cooperate mutually and execute the application B (an executing state 2 to be described later). In this way, triggered by switching between ON and OFF of the ACC switch, the application execution units 2d and 3c cooperate mutually and perform the switching operation of the executing state of the applications.

The application A is for making the function of the portable communication apparatus 3 executable on the vehicle communication apparatus 2, and is executed and controlled by the application execution units 2d and 3c. It is assumed that the application A is executed when the ACC switch is ON, namely, when the user is aboard the vehicle. It is preferable that the application A is executed automatically when the ACC switch is changed to ON, or it is also preferable that the application A is executed when the user performs a predetermined manipulation.

The application A has a function which enables the information (a screen or various buttons on the screen) displayed on the display unit of the portable communication apparatus 3 to be displayed on the display unit of the vehicle communication apparatus 2. Thus, the manipulability is improved with a large screen of the vehicle communication apparatus 2; the function is improved with a vehicle speaker.

Suppose that a user starts an application to play and listen to music with the portable communication apparatus 3 while the user is aboard a vehicle. The user can (i) display the play list of musical pieces on the display unit of the vehicle communication apparatus 2, (ii) control the portable communication apparatus 3 by an instruction manipulation on the display unit, and (iii) perform manipulations such as selecting a musical piece to reproduce, reproducing, stopping, and pausing of the selected musical piece, on the display screen. The user can also output the musical performance from the vehicle speaker via the vehicle communication apparatus 2. The application A uses an SPP (Serial Port Profile), in order to transmit and receive a reproduction command of the musical pieces, for example, between the vehicle communication apparatus 2 and the portable communication apparatus 3.

In contrast, the application B is for making the function of the vehicle communication apparatus 2 executable on the portable communication apparatus 3, and is executed and controlled by the application execution units 2d and 3c. It is assumed that the application B is executed when the ACC switch is OFF, namely, when the user has completed the use of a vehicle and is not aboard the vehicle, and when the user uses the function of the vehicle communication apparatus 2 on the portable communication apparatus 3. It is preferable that the application B is executed automatically when the ACC switch is changed to OFF, or it is also preferable that the application B is executed when the user performs a predetermined manipulation.

The application B has a function which enables the information (a screen or various buttons on the screen) displayed on the vehicle communication apparatus 2 to be displayed on the display unit of the portable communication apparatus 3. This enables the user to manipulate and control the electric charging and the pre-air conditioning of a vehicle, for example, at the time of alighting from the vehicle, by the remote manipulation from the portable communication apparatus 3. The application B uses the SPP, in order to transmit and receive the information of the vehicle communication apparatus 2 as described above, between the vehicle communication apparatus 2 and the portable communication apparatus 3.

Figure 2:
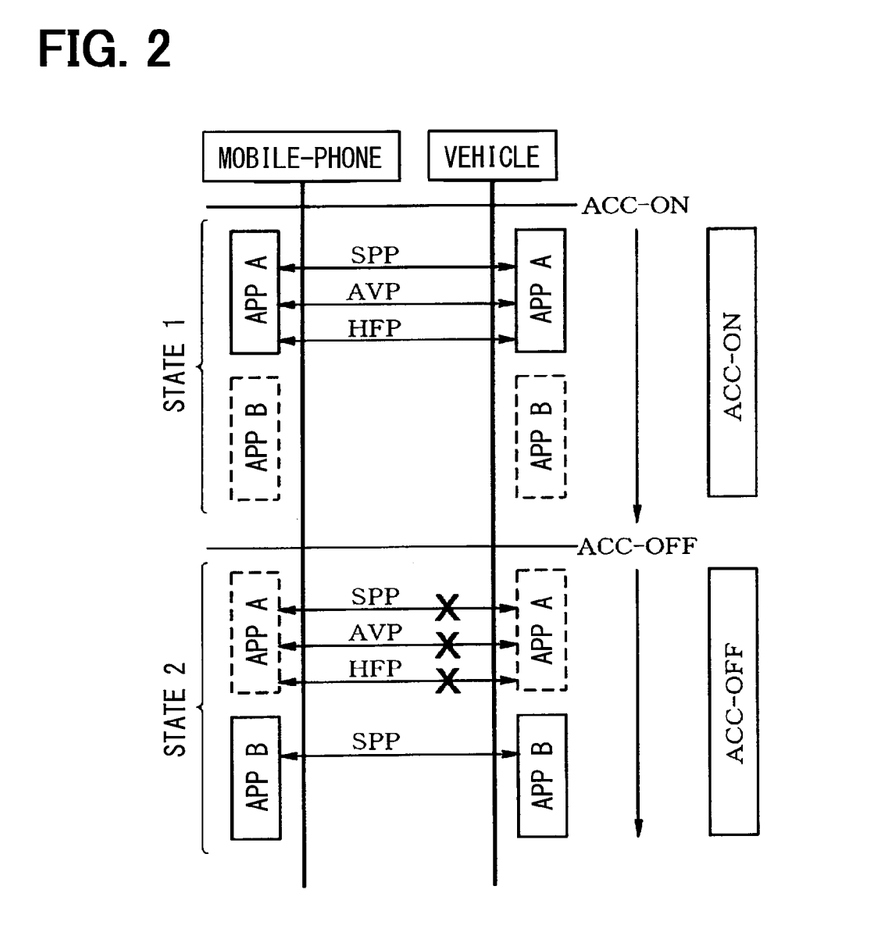
FIG. 2 is a drawing illustrating an executing state in a first embodiment.
Figure 3:
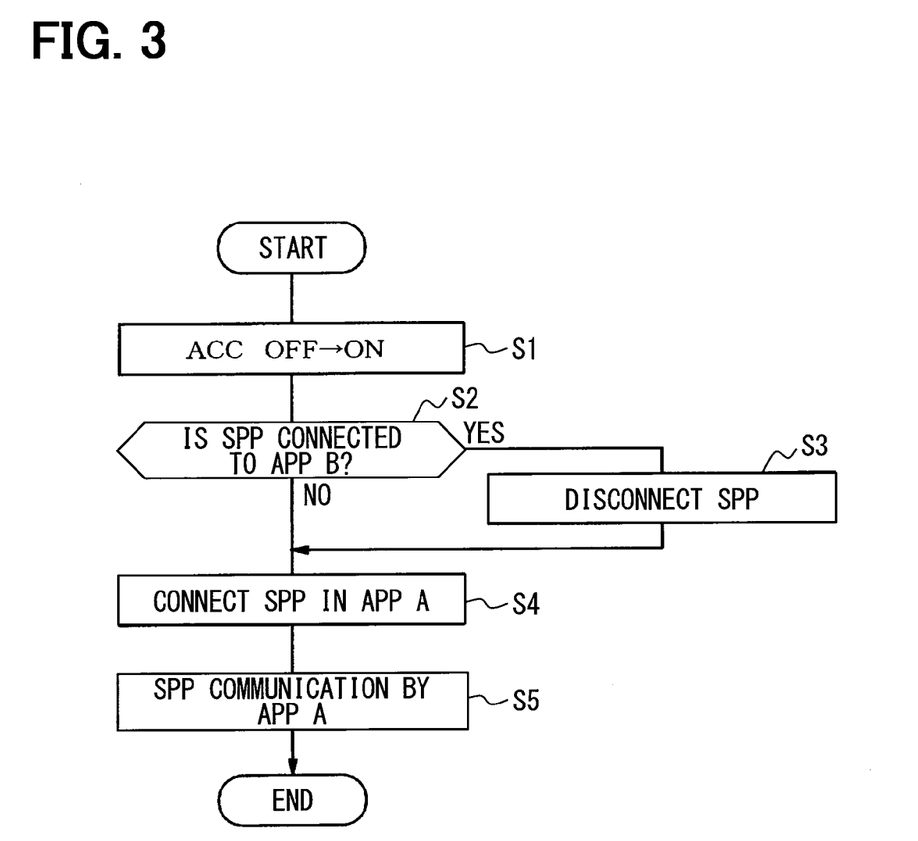
FIG. 3 is a flow-chart illustrating the flow of operation in an executing state 1.

In this way, both the application A and the application B use the SPP (the first profile). With reference to FIG. 2 and FIG. 3, the following explains the case where the application A is switched to an executing state and the vehicle communication apparatus 2 and the portable communication apparatus 3 operate in cooperation. Hereinafter, the present state is called "an executing state 1."

In FIG. 2, an application framed with a solid line signifies that the application A or the application B is in an executing state (where the application is activated), and an application framed with a broken line signifies that the application is in a non-executing state (where the application is deactivated) (same applies to FIG. 5 to be described below). The present embodiment assumes that the SPP is a profile of which the connection conflicts among several applications. Therefore, FIG. 3 pays special attention to the connection of the SPP (same applies to FIG. 4 to be described below). In practice, as illustrated in FIG. 2, the connection of other profiles, such as an AVP (Audio/Video Profile) and an HFP (Hands-Free Profile), is also switched, if required.

As illustrated in FIG. 3, when the ACC switch changes from OFF to ON (S1), the ACC determination unit 2a determines that the ACC switch has changed from OFF to ON and outputs the determination result to the connecting application control unit 2b. Responding to the determination result from the ACC determination unit 2a, the connecting application control unit 2b determines that there is a switching request to the executing state 1.

Here, the connecting application control unit 2b determines whether the wireless communication system 1 is in an executing state 2 described below. When it is determined that the wireless communication system 1 is in the executing state 2, the connecting application control unit 2b determines whether the SPP is connected to the application B (S2). When it is determined that the SPP is connected to the application B, the connecting application control unit 2b disconnects the SPP from the application B (S3).

Next, the connecting application control unit 2b cooperates with the connecting application control unit 3a and outputs a switching instruction to the executing state 1 to the application execution units 2d and 3c. Responding to the inputted switching instruction to the executing state 1, the application execution units 2d and 3c cooperate mutually, deactivate the application B, and execute the application A, in the vehicle communication apparatus 2 and the portable communication apparatus 3. Subsequently, the connecting application control unit 2b cooperates with the connecting application control unit 3a and outputs a profile connection instruction to the BT communication control units 2c and 3b.

Responding to the profile connection instruction inputted, the BT communication control units 2c and 3b connect each profile of the SPP, the AVP, and the HFP in the application A (S4). Subsequently, according to the request from the application execution units 2d and 3c, the communication in each profile in the application A is enabled (S5).

In this way, in the executing state 1, the application execution unit 2d of the vehicle communication apparatus 2 and the application execution unit 3c of the portable communication apparatus 3 execute the application A in cooperation. Accordingly, the vehicle communication apparatus 2 and the portable communication apparatus 3 operate in cooperation. This enables the application execution units 2d and 3c to display the information displayed on the portable communication apparatus 3 on the display unit of the vehicle communication apparatus 2, and to control the predetermined function of the portable communication apparatus 3 by the instruction input manipulation on the display unit of the vehicle communication apparatus 2.

Figure 4:
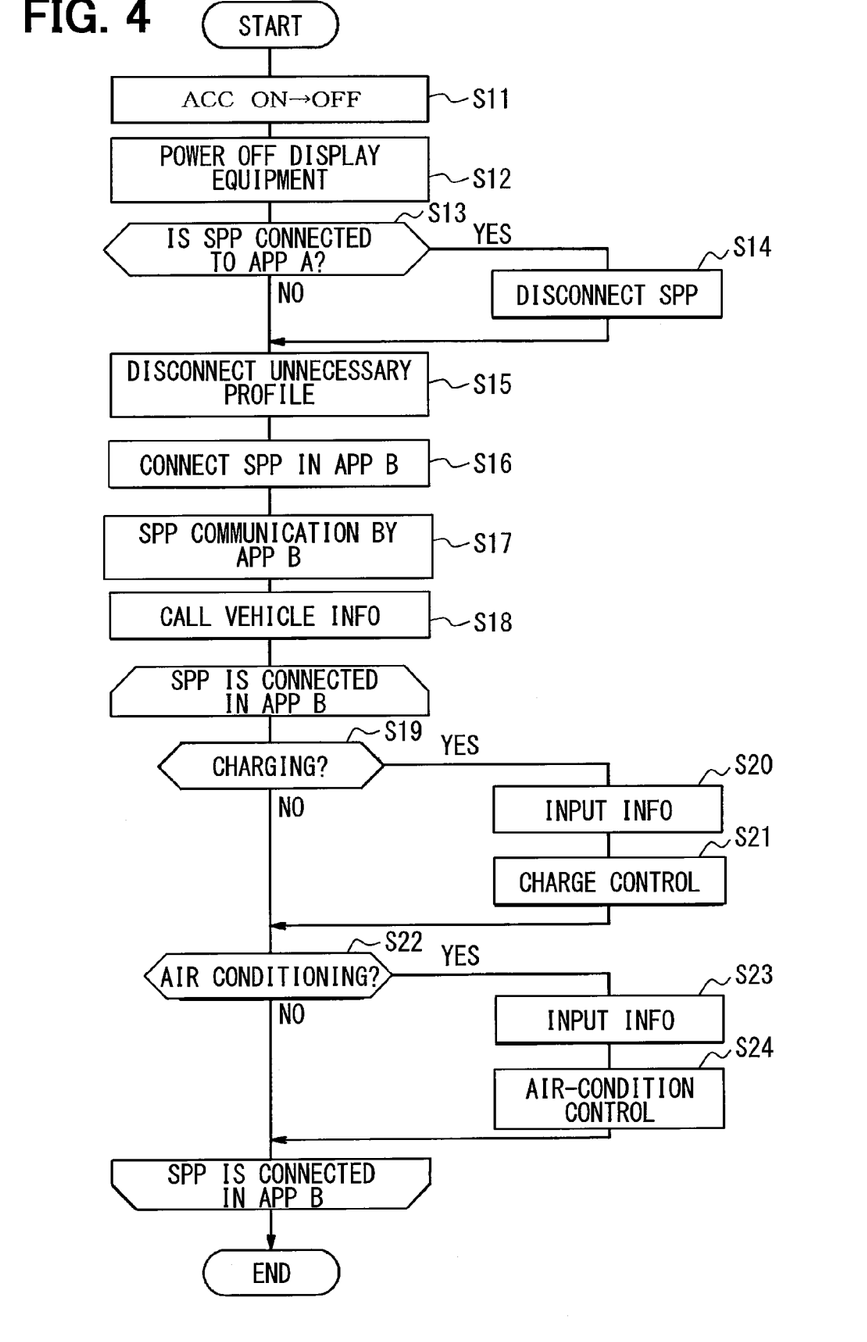
FIG. 4 is a flow-chart illustrating the flow of operation in an executing state 2.
Figure 5:
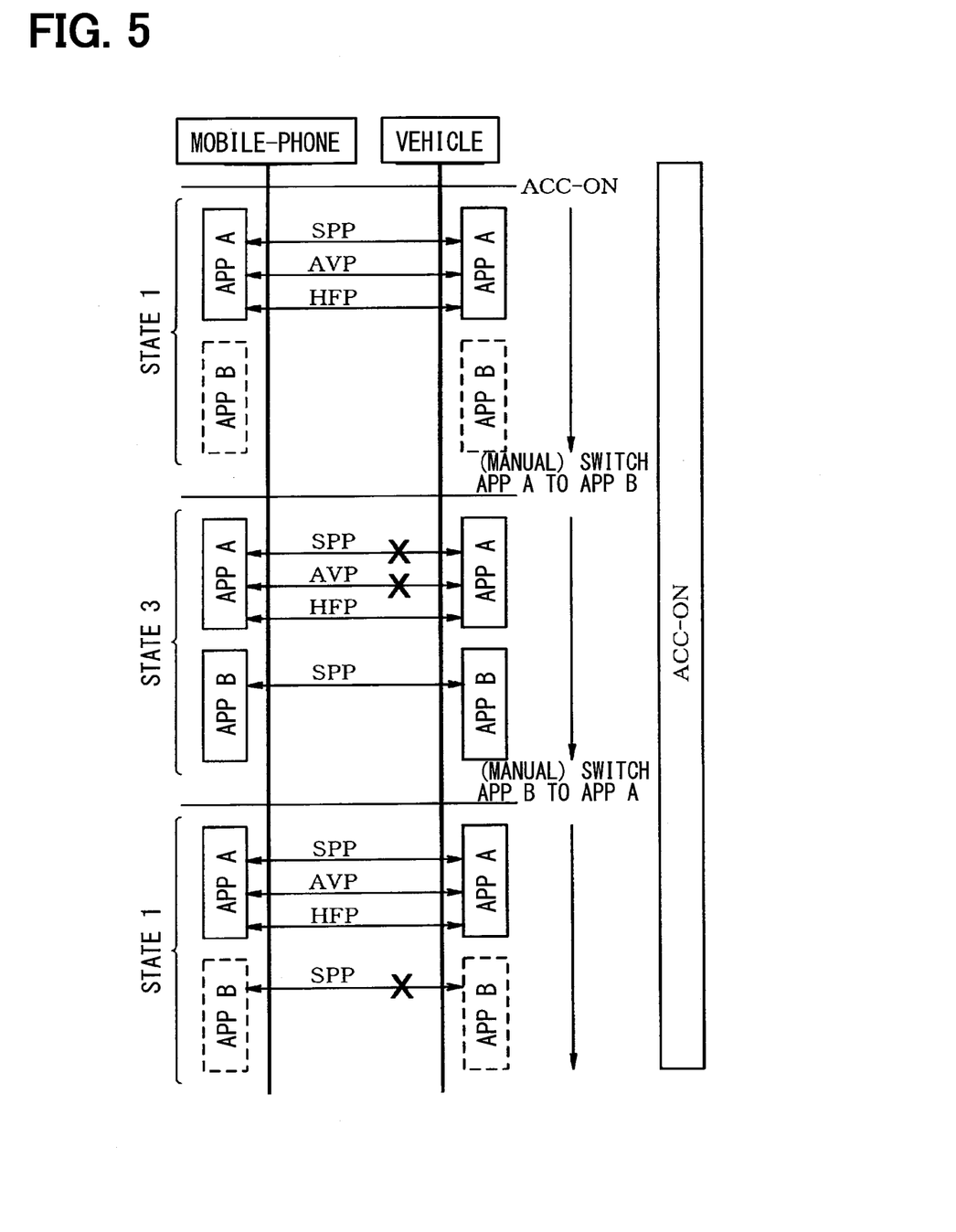
FIG. 5 is a drawing illustrating an executing state in a second embodiment.

Next, with reference to FIG. 2 and FIG. 4, the following explains the case where the ACC switch changes from ON to OFF, the application B becomes in an executing state, and the vehicle communication apparatus 2 and the portable communication apparatus 3 operate in cooperation. Hereinafter, the present state is called "an executing state 2." Note that the vehicle communication apparatus 2 is connected to a battery power source of the vehicle, and a CPU (Central Processing Unit) of the main body of the vehicle communication apparatus 2 is activated, even when the ACC switch is OFF. Therefore, even after the ACC switch is set to OFF, the application A and the application B are executable in the vehicle communication apparatus 2; accordingly, the vehicle communication apparatus 2 and the portable communication apparatus 3 can operate in cooperation.

First, as illustrated in FIG. 4, when the ACC switch changes from ON to OFF (S11), the ACC determination unit 2a determines that the ACC switch has changed from ON to OFF and outputs the determination result to the connecting application control unit 2b.

Here, the display control unit 2e sets to OFF a power source of the display unit of the vehicle communication apparatus 2, in a manner interlocked with the ACC switch changing to OFF (S12). The display unit of the vehicle communication apparatus 2 is not used in the executing state 2; therefore, setting it to OFF in this way enables to suppress the power consumption used by the vehicle to necessary minimum.

Subsequently, responding to the determination result from the ACC determination unit 2a, the connecting application control unit 2b determines that there is a switching request to the executing state 2. In cooperation with the connecting application control unit 3a, the connecting application control unit 2b outputs a switchover control instruction of the profile connection to the BT communication control units 2c and 3b. Responding to the inputted switchover control instruction of the profile connection, the BT communication control units 2c and 3b disconnect each profile of the SPP, the AVP, and the HFP which have been connected in the application A (S13, S14, S15).

Based on the determination result that there is a switching request to the executing state 2, the connecting application control unit 2b cooperates with the connecting application control unit 3a and outputs a switching instruction to the executing state 2 to the application execution units 2d and 3c. Responding to the inputted switching instruction to the executing state 2, the application execution units 2d and 3c cooperate mutually, deactivate the application A, and execute the application B, in the vehicle communication apparatus 2 and the portable communication apparatus 3.

Subsequently, the connecting application control unit 2b cooperates with the connecting application control unit 3a and outputs a profile connection instruction to the BT communication control units 2c and 3b. Responding to the profile connection instruction inputted, the BT communication control units 2c and 3b connect the SPP in the application B (S16). This enables the data communications by the SPP in the application B (S17), in responding to the request from the application execution units 2d and 3c.

Here, the AVP and the HFP are illustrated as an example. However, even when there is another profile connection, such as a PBAP (Phone Book Access Profile), the profile is disconnected since the profile is not used in the executing state 2. This enables to free the communication band occupied by the disconnected profile and to reduce the processing load. This enhances the data communications in the executing state 2.

In the executing state 2, in cooperation with the application execution unit 2d, the application execution unit 3c calls up the vehicle information such as fuel efficiency information and a driving history, by outputting the information output instruction to the vehicle information managing unit 2h (S18), and displays the vehicle information on the display unit of the portable communication apparatus 3, by outputting the display control instruction based on the vehicle information to the display control unit 3d.

Next, a user can check the vehicle information displayed on the display unit and determine whether to execute electric charging. This permits a charge control in an EV (Electric Vehicle) or a PHV (Plug-in Hybrid Vehicle) to be performed through a manipulation on the screen of the display unit of the portable communication apparatus 3.

The electric charging is executed with the following controls. First, when a user manipulates a control button which is displayed on the display unit of the portable communication apparatus 3, an electric charging instruction is outputted to the display control unit 3d from the display unit (S19). The display control unit 3d outputs, to the application execution unit 3c, the charge control information according to the inputted electric charging instruction. The charge control information inputted into the application execution unit 3c is inputted into the application execution unit 2d by the cooperation of the application execution units 2d and 3c (S20). The application execution unit 2d outputs the charge control instruction according to the charge control information to the charge control unit 2f; the charge control unit 2f executes the charge control based on the inputted charge control instruction (S21).

The pre-air conditioning is executed with the following controls. First, when a user manipulates a control button which is displayed on the screen of the display unit of the portable communication apparatus 3, an air conditioning instruction is outputted to the display control unit 3d (S22). The display control unit 3d outputs the air conditioning control information according to the inputted air conditioning instruction to the application execution unit 3c. The air conditioning control information inputted into the application execution unit 3c is inputted into the application execution unit 2d by the cooperation of the application execution units 2d and 3c (S23). The application execution unit 2d outputs the air conditioning control instruction according to the air conditioning control information to the air conditioning control unit 2g, and the air conditioning control unit 2g executes the air conditioning control based on the inputted air conditioning control instruction (S24).

As illustrated in FIG. 4, the electric charging instruction (S19) and the air conditioning instruction (S22) are repeatedly executed, in the executing state 2 in which the SPP is connected to the application B.

The application execution unit 3c acquires the cooperation information in the cooperation-information control managing unit 4a via the wide area communication control units 3e and 4b; the cooperation information is needed when the application execution units 2d and 3c cooperate.

As described above, in the executing state 2, the user can perform the charge control and the air conditioning by controlling the vehicle communication apparatus 2 through the remote manipulation from the portable communication apparatus 3. This improves the convenience of the user of a vehicle.

Moreover, the vehicle communication apparatus 2 and the portable communication apparatus 3 operate in cooperation, through the cooperative execution of the application B by the application execution unit 2d of the vehicle communication apparatus 2 and the application execution unit 3c of the portable communication apparatus 3. This enables to display the information of the vehicle communication apparatus 2 onto the display unit of the portable communication apparatus 3, and to control the predetermined function of the vehicle communication apparatus 2 by the instruction input manipulation on the display unit of the portable communication apparatus 3.

As explained above, in the present embodiment, when switching from the executing state 1 to the executing state 2, the SPP in the application A is once disconnected, then the SPP in the application B is connected, which makes reliable the connection of a profile to be used in the application B. This can avoid the trouble in which the profile in the application A and the profile in the application B cannot be connected due to conflict and in which the cooperative operation of the vehicle communication apparatus 2 and the portable communication apparatus 3 is impeded consequently. Thus, the connection of a profile used by the application A or the application B can be switched properly and the service by the application A or the application B can be provided properly.

When switching from the executing state 1 to the executing state 2, a profile which becomes unnecessary in the executing state 2 (the second profile) is disconnected. This results in eliminating an unnecessary processing burden and communication load, to realize power saving. In the executing state 2, the operation of the display unit which becomes unnecessary in operation is stopped. This results in suppressing the amount of the power consumption.

(Second Embodiment)

Next, a second embodiment of the present disclosure is described with reference to FIG. 5, FIG. 6A, FIG. 6B, and FIG. 6C. The second embodiment assumes the case where an executing state is switched manually. This enables to switch an executing state with a user's intention by the instruction input manipulation in a control button on the display unit of the vehicle communication apparatus 2.

The present embodiment assumes that (i) the ACC switch is ON and (ii) the user is aboard the vehicle or the vehicle communication apparatus 2 and the portable communication apparatus 3 are at least in the distance in which the Bluetooth communication is possible. In the present embodiment, the state where the application B becomes in an executing state and where the vehicle communication apparatus 2 and the portable communication apparatus 3 operate in cooperation is called an "executing state 3." As described below, the executing states 3 differs from the executing state 2 in the first embodiment with respect to the executing state of an application and the connected state of a profile. The executing state 1 in the present embodiment is the same as the executing state 1 in the first embodiment.

The present embodiment enables to switch the executing state manually, by a user manipulating a control button which is displayed on the display unit of the vehicle communication apparatus 2. This permits a user to control the vehicle communication apparatus 2 using the portable communication apparatus 3.

The switching of the executing state is performed as follows. First, it is assumed that the user is aboard the vehicle and the ACC switch is ON. Accordingly, as illustrated in FIG. 5, the wireless communication system 1 is in the executing state 1. In the executing state 1, the application A is executed and each profile of the SPP, the AVP, and the HFP is connected with the application A.

Figure 6A:
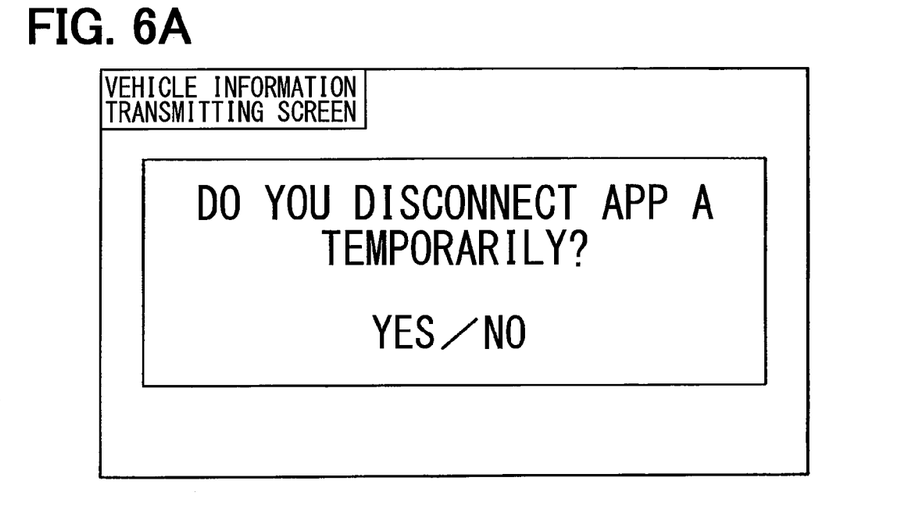
FIG. 6A is a drawing illustrating a typical display of a monitoring screen of a vehicle communication apparatus.

As illustrated in FIG. 6A, when the user manipulates the display screen of the vehicle communication apparatus 2, the display control unit 2e displays a phrase saying a "VEHICLE INFORMATION TRANSMITTING SCREEN" on the display unit, and signifies that the screen displayed now is a screen to input the instructions for transmitting the information on the vehicle communication apparatus 2 to the portable communication apparatus 3. In addition, the display control unit 2e displays a message saying "DO YOU DISCONNECT APP A TEMPORARILY? YES/NO" on the manipulation screen, and allows the user to select whether to switch from the executing state 1 to the executing state 3 by disconnecting each profile of the SPP and the AVP in the application A. In response to this, the user depresses the "YES" portion, when switching from the executing state 1 to the executing state 3. The manipulation screen acts as a touch panel; when the display region of "YES/NO" is depressed, the display unit outputs the switchover control information of the executing state to the display control unit 2e.

Figure 6B:
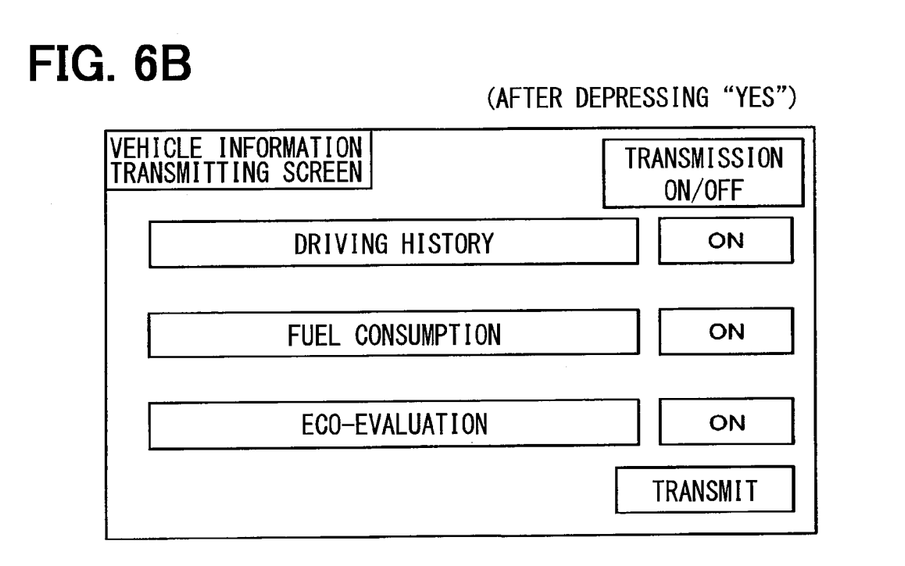
FIG. 6B is a drawing illustrating a typical display of the monitoring screen of the vehicle communication apparatus; and, FIG. 6C is a drawing illustrating a typical display of the monitoring screen of the vehicle communication apparatus.

Next, as illustrated in FIG. 6B, the display control unit 2e displays vehicle information items of "DRIVING HISTORY INFORMATION", "FUEL EFFICIENCY INFORMATION", and "ECO-OPERATION EVALUATION" on the display unit in a selectable manner. The user can select, with his or her own intention, which vehicle information item to be transmitted from the vehicle communication apparatus 2 to the portable communication apparatus 3. When the user selects the desired vehicle information item and depresses a "TRANSMIT" portion, the display unit outputs the information of the selected vehicle information item to the display control unit 2e. Subsequently, the display control unit 2e outputs the switchover control information of the executing state described above and the information of the selected vehicle information item to the application execution unit 2d, and the application execution unit 2d outputs the switchover control information of the executing state to the connecting application control unit 2b.

Next, the connecting application control unit 2b determines that there is a switching request to the executing state 3, based on the inputted switchover control information of the executing state. Based on the determination result, the connecting application control unit 2b cooperates with the connecting application control unit 3a and outputs, to the application execution units 2d and 3c, the switching instruction to the executing state 3.

Here, the connecting application control unit 2b determines whether the SPP and the AVP are connected to the application A; when connected, the connecting application control unit 2b disconnects the SPP and the AVP in the application A. This enables to (i) free the communication band occupied by the part which has transmitted and received the audio data, and also (ii) mitigate the processing load for communicating the audio data. Accordingly, the data communications in the executing state 3 become more efficient.

Suppose a case where when the user is outputting the musical piece reproduction of a music application of the portable communication apparatus 3 to the vehicle communication apparatus 2 in the executing state 1, the user wishes to switch to the executing state 3 while keeping outputting the musical piece reproduction of the music application to the vehicle communication apparatus 2. Such a case desires to enable the user to make a selection not to disconnect the AVP in the application A.

Next, in response to the inputted switching instruction to the executing state 3, the application execution units 2d and 3c cooperate mutually to execute the application B in the vehicle communication apparatus 2 and the portable communication apparatus 3. The connecting application control unit 2b cooperates with the connecting application control unit 3a and outputs a profile connection instruction to the BT communication control units 2c and 3b. In response to the inputted profile connection instruction, the BT communication control units 2c and 3b connect the SPP in the application B.

Subsequently, in response to the request of the application execution units 2d and 3c, the communication by the SPP in the application B is enabled. Thus, the wireless communication system 1 is switched to the executing state 3. Here, the application A is not deactivated and the HFP in the application A remains connected.

The application execution unit 2d cooperates with the application execution unit 3c and outputs the vehicle information, such as "DRIVING HISTORY INFORMATION", "FUEL EFFICIENCY INFORMATION", and "ECO-OPERATION EVALUATION", according to the information on the inputted vehicle information item to the application execution unit 3c of the portable communication apparatus 3. The application execution unit 3c outputs the display instruction according to the vehicle information to the display control unit 3d. The display control unit 3d displays the vehicle information according to the display instruction on the display unit of the portable communication apparatus 3. When the user seeing the displayed vehicle information wishes to charge the vehicle, the charge control of the vehicle can be performed by the instruction manipulation in the display unit of the portable communication apparatus 3, as is the case with the executing state 2 of the first embodiment.

The above assumes that the user is aboard the vehicle; accordingly, the HFP in the application A remains connected without being disconnected, in preparation for an arrival of an incoming call. That is, in the executing state 3, the application A is executed in the state where the HFP is connected. Accordingly, when there is an arrival of an incoming call, the incoming call can be switched to the hands-free telephone call using the vehicle communication apparatus 2. The connection of the HFP in the application A and the connection of the SPP in the application B do not conflict. This permits the concurrent connection in both applications.

Figure 6C:
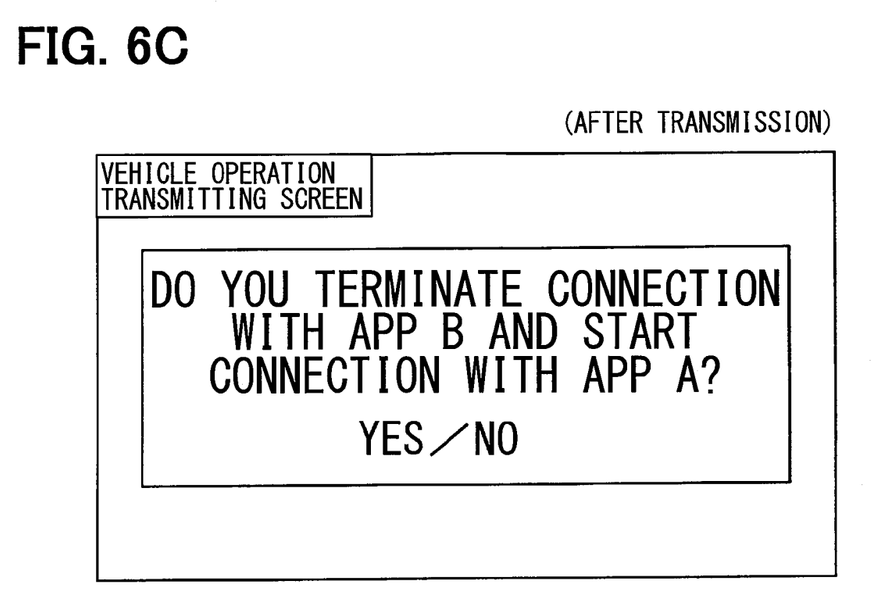

Next, as illustrated in FIG. 6C, the display control unit 2e displays a message saying "DO YOU TERMINATE CONNECTION WITH APP B AND START CONNECTION WITH APP A? YES/NO", on the display unit of the vehicle communication apparatus 2. When the user wishes to return to the executing state 1 after having checked the transmitted information on the portable communication apparatus 3 and having performed the charge control, the user depresses the "YES" portion of the display unit of the vehicle communication apparatus 2. Then, the display unit of the vehicle communication apparatus 2 outputs the switchover control information of the executing state to the display control unit 2e. The switchover control information of the executing state is outputted to the connecting application control unit 2b via the application execution unit 2d. The connecting application control unit 2b determines that there is a switching request to the executing state 1, based on the inputted switchover control information of the executing state.

Here, the connecting application control unit 2b determines whether the SPP is connected to the application B; when connected, the connecting application control unit 2b disconnects the SPP in the application B. Subsequently, based on the determination result that there is a switching request to the executing state 1, the connecting application control unit 2b cooperates with the connecting application control unit 3a, and outputs a switching instruction to the executing state 1 to the application execution units 2d and 3c. In response to the inputted switching instruction to the executing state 1, the application execution units 2d and 3c cooperate mutually to deactivate the application B in the vehicle communication apparatus 2 and the portable communication apparatus 3.

Subsequently, the connecting application control unit 2b cooperates with the connecting application control unit 3a and outputs a profile connection instruction to the BT communication control units 2c and 3b. In response to the inputted profile connection instruction, the BT communication control units 2c and 3b connect the SPP in the application A and the AVP when the AVP is disconnected in the executing state 3. The application A is executed also in the executing state 3. Accordingly, the connecting application control units 2b and 3a do not issue the execution instruction of the application A again to the application execution units 2d and 3c.

Subsequently, according to the request from the application execution units 2d and 3c, the communication in each profile in the application A is enabled. Thus, the wireless communication system 1 returns to the executing state 1.

As described above, the application A is not deactivated in the executing state 3 but remains activated; this enables to return to the executing state 1 by the manipulation described above. The HFP in the application A is not disconnected but remains connected without reconnecting; this enables to perform communications by the HFP in the application A in the executing state 1.

As explained above, the present embodiment produces the same effect as in the first embodiment; furthermore, the above-described configuration enables to switch the executing state by a user's manual operation. The switching of the profile accompanying the switching of the executing state is made automatically and properly, improving the user's convenience. Furthermore, the vehicle information is not simply transmitted automatically with the switching of the executing state as in the first embodiment; instead, the information to be transmitted on the display unit of the vehicle communication apparatus 2 can be determined. This enables to transmit the information according to the user's intention, thereby improving the convenience.

(Other Embodiments)

Although the embodiments of the present disclosure have been explained, the present disclosure is not restricted thereto and it can be modified and extended variously in the range which does not deviate from the gist of the disclosure.

The short-range wireless communication is not restricted to Bluetooth. For example, if exhibiting a similar issue such as the conflict of connection, a wireless LAN connection can apply the present disclosure.

The above explanation assumes that the conflicting profile is the SPP; however, there is no intention to restrict it to the SPP. The present disclosure can be applied to any profile if the connection of the profile conflicts.

The switching of the ACC switch between ON and OFF and the switching by manual operation are exemplified as the trigger in switching the executing state. However, it is not necessary to restrict it to them. For example, the executing state can be switched in cooperation with a smart entry system.

In the second embodiment, the executing state is switched after depressing the "TRANSMIT" portion of FIG. 6B. The executing state can be switched after depressing the "YES" portion of FIG. 6A.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A wireless communication system comprising:
  a vehicle communication apparatus that includes
    an in-vehicle profile connection device that connects one or more profiles, and
    an in-vehicle application execution device that executes a first application using at least a first profile of the one or more profiles connected by the in-vehicle profile connection device; and
  a portable communication apparatus that includes
    an in-portable profile connection device that connects one or more profiles of the one or more profiles, and
    an in-portable application execution device that executes a second application using the first profile of one or more of the one or more profiles connected by the in-portable profile connection device,
  the wireless communication system connecting the first profile that specifies short-range wireless communication of data between the in-vehicle profile connection device and the in-portable profile connection device, when the in-vehicle application execution device and the in-portable application execution device execute any one of the first application and the second application,
  the wireless communication system further comprising:
  a determination device that determines a switching request of an executing state of an application; and
  a profile connection control device that controls connection of one or more profiles of the one or more profiles between the in-vehicle profile connection device and the in-portable profile connection device, wherein the determination device determines a switching request wherein the switching request is either a first switching request or a second switching request upon the determination device determining the first switching request from a first executing state to a second executing state, the first executing state in which the first application is executed in cooperation with the in-vehicle application execution device and the in-portable application execution device, the second executing state in which the second application is executed in cooperation with the in-vehicle application execution device and the in-portable application execution device, the profile connection control device switches from a connection of the first profile used to execute the first application between the in-vehicle profile connection device and the in-portable profile connection device to a connection of the first profile used to execute the second application between the in-vehicle profile connection device and the in-portable profile connection device, whereas upon the determination device determining the second switching request from the second executing state to the first executing state, the second switching request being inverse to the first switching request in switching direction between the first executing state and the second executing state, the profile connection control device switches from the connection of the first profile used to execute the second application between the in-vehicle profile connection device and the in-portable profile connection device, to the connection of the first profile used to execute the first application between the in-vehicle profile connection device and the in-portable profile connection device.

2. The wireless communication system according to claim 1, wherein upon the determination device determining the first switching request from the first executing state to the second executing state, the profile connection control device disconnects a second profile which is currently connected between the in-vehicle profile connection device and the in-portable profile connection device, the second profile becoming unnecessary in the second executing state.

3. The wireless communication system according to claim 2, wherein after disconnecting the second profile in case that the determination device determines the first switching request from the first executing state to the second executing state, the profile connection control device reconnects the second profile upon the determination device determining the second switching request from the second executing state to the first executing state.

4. The wireless communication system according to claim 1, wherein the determination device determines the first switching request or the second switching request between the first executing state and the second executing state according to ON or OFF of a vehicle power source.

5. The wireless communication system according to claim 1, wherein the determination device determines the first switching request or the second switching request between the first executing state and the second executing state according to a manipulation by a user to the vehicle communication apparatus or the portable communication apparatus.

6. The wireless communication system according to claim 1, wherein the short-range wireless communication is a wireless communication with Bluetooth.

7. The wireless communication system according to claim 6, wherein the first profile is an SPP (Serial Port Profile).

8. A vehicle communication apparatus comprising:

an in-vehicle profile connection device that connects a profile with an in-portable profile connection device of a portable communication apparatus;

an in-vehicle application execution device that executes a first application using the profile connected by the in-vehicle profile connection device; and a determination device that determines a switching request of an executing state of an application, the vehicle communication apparatus further comprising an in-vehicle profile connection control device that controls connection of the profile between the in-vehicle profile connection device and the in-portable profile connection device, wherein the determination device determines a switching request wherein the switching request is either a first switching request or a second switching request upon the determination device determining the first switching request from a first executing state to a second executing state, the first executing state in which the first application is executed in cooperation with the in-vehicle application execution device and the in-portable application execution device, the second executing state in which a second application is executed in cooperation with the in-vehicle application execution device and the in-portable application execution device, the in-vehicle profile connection control device switches from a connection of a first profile used to execute the first application between the in-vehicle profile connection device and the in-portable profile connection device to a connection of the first profile used to execute the second application between the in-vehicle profile connection device and the in-portable profile connection device, whereas upon the determination device determining the second switching request from the second executing state to the first executing state, the second switching request being inverse to the first switching request in switching direction between the first executing state and the second executing state, the in-vehicle profile connection control device switches from the connection of the first profile used to execute the second application between the in-vehicle profile connection device and the in-portable profile connection device, to the connection of the first profile used to execute the first application between the in-vehicle profile connection device and the in-portable profile connection device.

9. A portable communication apparatus comprising:

an in-portable profile connection device that connects a profile with an in-vehicle profile connection device of a vehicle communication apparatus; and an in-portable application execution device that executes a first application using the profile connected by the in-portable profile connection device, the portable communication apparatus further comprising an in-portable profile connection control device that controls connection of the profile between the in-vehicle profile connection device and the in-portable profile connection device, wherein upon detecting a first switching request from a first executing state to a second executing state,
the first executing state in which the first application is executed in cooperation with the in-vehicle application execution device and the in-portable application execution device,
the second executing state in which a second application is executed in cooperation with the in-vehicle application execution device and the in-portable application execution device,
the in-portable profile connection control device switches
from a connection of a first profile used to execute the first application between the in-vehicle profile connection device and the in-portable profile connection device
to a connection of the first profile used to execute the second application between the in-vehicle profile connection device and the in-portable profile connection device, whereas upon detecting a second switching request from the second executing state to the first executing state, the second switching request being inverse to the first switching request in switching direction between the first executing state and the second executing state,
the in-portable profile connection control device switches
from the connection of the first profile used to execute the second application between the in-vehicle profile connection device and the in-portable profile connection device,
to the connection of the first profile used to execute the first application between the in-vehicle profile connection device and the in-portable profile connection device.

10. The wireless communication system according to claim 1, wherein
the first application causes a function of the portable communication apparatus to be executable in the vehicle communication apparatus, whereas
the second application causes a function of the vehicle communication apparatus to be executable in the portable communication apparatus.

11. The wireless communication system according to claim 10, wherein
the first switching request from the first executing state to the second executing state takes place when a vehicle power source switches from ON state into OFF state, whereas
the second switching request from the second executing state to the first executing state takes place when the vehicle power source switches from OFF state into ON state.

12. A wireless communication system comprising:
a vehicle communication apparatus in a vehicle, the vehicle communication apparatus includes an in-vehicle profile connection device and an in-vehicle application execution device; and a portable communication apparatus that includes an in-portable profile connection device and an in-portable application execution device, wherein one or more profiles are connected between the in-vehicle profile connection device and the in-portable profile connection device, wherein both the in-vehicle application execution device and the in-portable application execution device execute one of a plurality of applications by using the one or more profiles connected between the in-vehicle profile connection device and the in-portable profile connection device, and wherein the one or more profiles include a first profile used to execute either a first application or a second application among the plurality of applications, the first profile specifies short-range wireless communication of data between the in-vehicle profile connection device and the in-portable profile connection device, the wireless communication system further comprising:
a determination device that determines whether (i) a switching request requesting an executing state of the second application or (ii) a switching request requesting an executing state of the first application arises; and
a profile connection control device that controls connection of the one or more profiles between the in-vehicle profile connection device and the in-portable profile connection device based on a determining by the determination device, wherein upon the determination device determining that the switching request requesting the executing state of the second application, arises,
the profile connection control device switches
from a connection of the first profile used to execute the first application between the in-vehicle profile connection device and the in-portable profile connection device
to a connection of the first profile used to execute the second application between the in-vehicle profile connection device and the in-portable profile connection device, whereas upon the determination device determining that the switching request requesting the executing state of the first application arises,
the profile connection control device switches
from the connection of the first profile used to execute the second application between the in-vehicle profile connection device and the in-portable profile connection device
to the connection of the first profile used to execute the first application between the in-vehicle profile connection device and the in-portable profile connection device.

13. The wireless communication system according to claim 12, wherein
upon the determination device determining that the switching request requesting the executing state of the second application arises, the profile connection control device disconnects, among the one or more profiles, a second profile which is different from the first profile and currently connected between the in-vehicle profile connection device and the in-portable profile connection device, the second profile becoming unnecessary in the executing state of the second application.

14. The wireless communication system according to claim 13, wherein after disconnecting the second profile in case that the determination device determines that the switching request requesting the executing state of the second application, the profile connection control device reconnects the second profile upon the determination device determining that the switching request requesting the executing state of the first application arises.

15. The wireless communication system according to claim 12, wherein
the first application causes a function of the portable communication apparatus to be executable in the vehicle communication apparatus, whereas
the second application causes a function of the vehicle communication apparatus to be executable in the portable communication apparatus.

16. The wireless communication system according to claim 15, wherein
the switching request requesting the executing state of the second application arises in response to a vehicle power source of the vehicle switching from ON state into OFF state, whereas
the switching request requesting the executing state of the first application arises in response to the vehicle power source switching from OFF state into ON state.

17. The wireless communication system according to claim 12, wherein
the determination device determines whether the switching request requesting the executing state of the second application or the switching request requesting the executing state of the first application arises, according to a manipulation by a user to the vehicle communication apparatus or the portable communication apparatus.

18. The wireless communication system according to claim 12, wherein
the short-range wireless communication is a wireless communication with Bluetooth, and
the first profile is an SPP (Serial Port Profile).

19. A vehicle communication apparatus included in the wireless communication system according to claim 12, the vehicle communication apparatus comprising:
the determination device; and
the profile connection control device.

20. A portable communication apparatus included in the wireless communication system according to claim 12, wherein the vehicle communication apparatus includes the determination device,
the portable communication apparatus comprising:
the profile connection control device.

21. The wireless communication system according to claim 1, wherein
the determination device resides in the vehicle communication apparatus and the profile connection device resides in a vehicle.

* * * * *